United States Patent [19]

Mimura et al.

[11] 4,408,741
[45] Oct. 11, 1983

[54] BINDING DEVICE FOR ELONGATED PIPES

[75] Inventors: Fumio Mimura, Kawasaki; Hiroo Asakawa, Yokohama, both of Japan

[73] Assignees: Nichiei Distribution Systems, Inc., Kawasaki; Nippon Kokan Kabushiki Kaisha, Tokyo, both of Japan

[21] Appl. No.: 286,367

[22] Filed: Jul. 23, 1981

[51] Int. Cl.³ .............................................. F16L 3/22
[52] U.S. Cl. ................................... 248/68 CB; 52/668
[58] Field of Search ................... 248/68 R, 68 CB; 206/443, 516; 211/74, 189; 217/43 R, 45, 66; 52/656, 668, 669

[56] References Cited

U.S. PATENT DOCUMENTS

| 2,084,118 | 6/1937 | Zabriskie | 52/668 X |
| 2,661,110 | 12/1953 | Allavena | 217/66 X |
| 3,237,786 | 3/1966 | Milliken | 206/443 X |
| 3,294,225 | 12/1966 | Kenyon | 206/443 X |
| 3,414,152 | 12/1968 | Overton | 217/66 X |
| 4,099,626 | 7/1978 | Magnussen | 248/68 CB X |
| 4,124,445 | 11/1978 | Mollon | 248/68 R X |

FOREIGN PATENT DOCUMENTS 1223045  2/1971  United Kingdom ............ 248/68 R

Primary Examiner—William H. Schultz
Assistant Examiner—Ramon O. Ramirez
Attorney, Agent, or Firm—Darby & Darby

[57] ABSTRACT

A binding device for a plurality of elongated pipes is provided which comprises sleepers, spacers and bundling strap means for tightly fastening and encircling a plurality of sleepers and spacers, thereby the sleepers and spacers extending respectively in spaced relation to each other and are assembled to form a plurality of spaces defined by the surfaces of the sleepers and spacers and adapted to receive the outer peripheral surfaces of the respective elongated pipes in tight contact relation thereto. Each elongated pipe is separately held by the respective space and secured tightly, thus preventing the pipes from bending, twisting or any damages.

8 Claims, 6 Drawing Figures

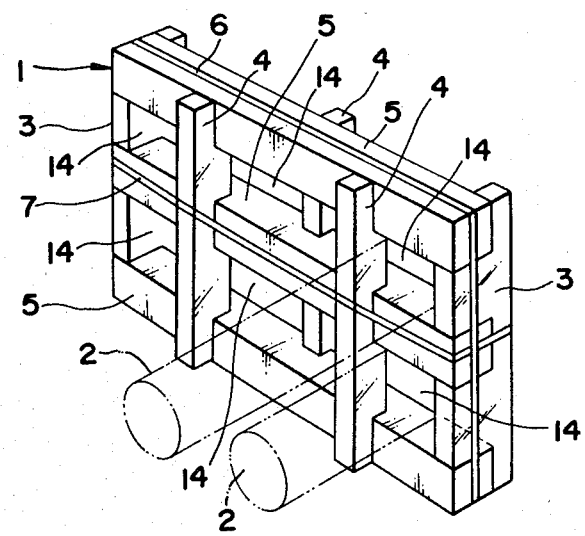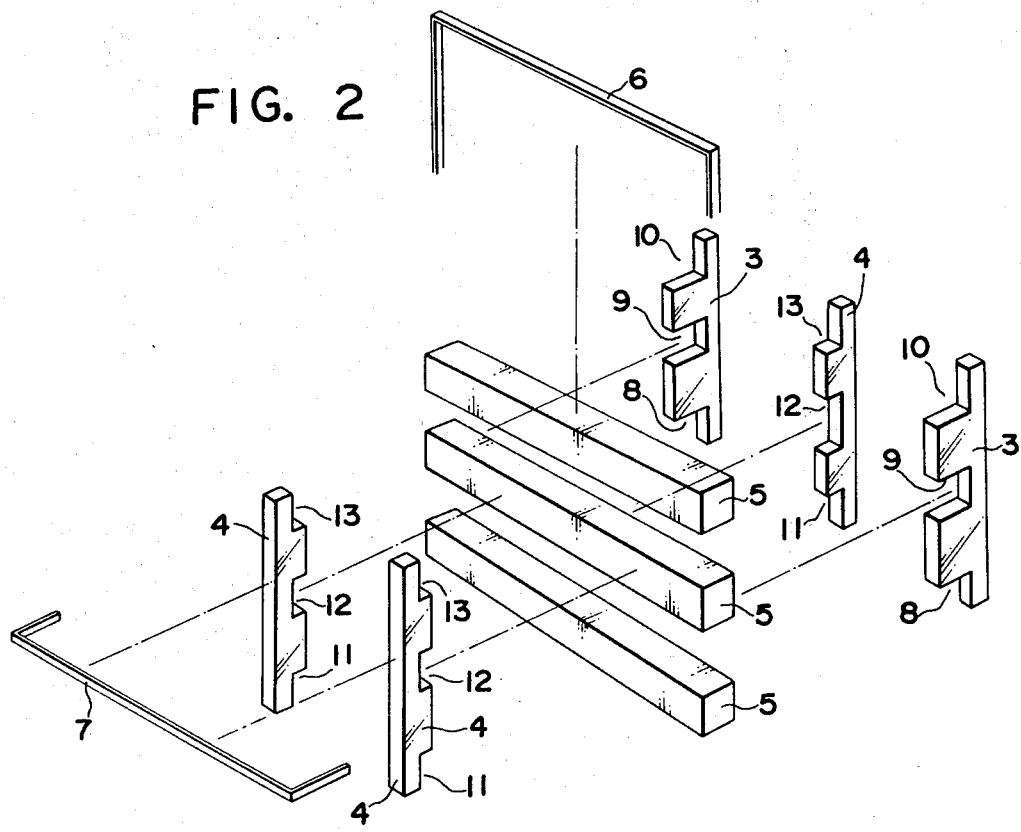

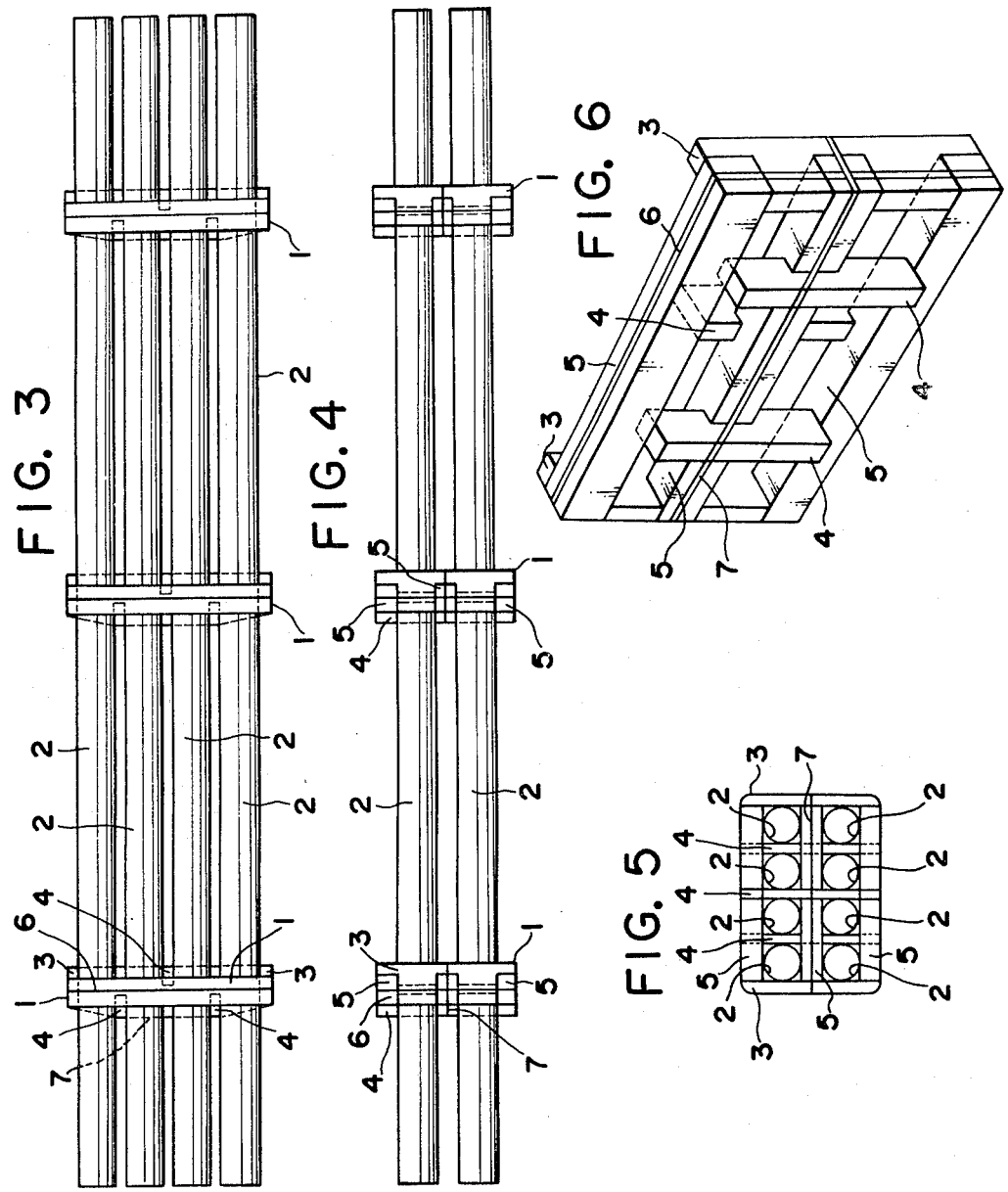

BINDING DEVICE FOR ELONGATED PIPES

BACKGROUND OF THE INVENTION

1. Field of the Invention

This invention relates to a binding device for shipping and the storage of a plurality of elongated pipes.

2. Prior Art

In those known cases in the prior art, a plurality of elongated pipes have been accumulated in a bundle and then tightly secured together with a steel wire or the like. This binding method however brings about some disadvantages that since the elongated pipes within the bundle are likely to shift and are poorly fixed, the pipes are liable to crush, bending or damages during storage, handling or transportation, and moreover it is difficult to attain a stable, safe and quick handling of the elongated pipes. Furthermore, the elongated pipes which are in direct contact with the adjacent pipes are subjected to possible damages against the surface of the pipes. In addition to the above disadvantages, the provision of steel wires alone so as to bundle a plurality of elongated pipes is dangerous in view of a possible breakage of the steel wires during handling, transportation or storage, particularly in a stacked storage.

SUMMARY OF THE INVENTION

It is therefore an object of this invention to provide a binding device for a plurality of elongated pipes in which the above disadvantages are fully eliminated.

It is a further object to provide a novel and improved binding device for a plurality of elongated pipes with relatively simple construction and inexpensive material to manufacture.

According to this invention the binding device for a plurality of elongated pipes is comprised of sleepers, spacers and bundling strap means for tightly fastening and encircling a plurality of sleepers and spacers, whereby the sleepers and spacers extend respectively in spaced relation to each other and are assembled to form a plurality of spaces defined by the surfaces of the sleepers and spacers and adapted to receive the outer peripheral surfaces of the elongated pipes in tight contact relation thereto. The sleepers are disposed in spaced and parallel arrangement to each other both in a vertical direction one over the other and in a horizontal direction side by side, and a plurality of the elongated pipes are placed side by side on and in transverse relation to each sleeper. The spacers formed on a respective surface at intervals along its length a plurality of recesses, which are respectively adapted to couple with each sleeper, are disposed in spaced arrangement to each other in a transverse relation to the sleeper.

According to another aspect of the present invention, the spacers are disposed one by one alternately first to couple with the one side of the sleepers at their recesses and then to couple with the other side of the sleepers at their recesses such that the sleepers are interposed between the spacers. Each spacer has among recesses formed on the surface thereof the recesses defined by two right angled surfaces and having substantially L-shaped cross section at the both ends of its length. The spacers positioned between the both ends of the sleepers may respectively be formed to have only those recesses which couple with the sleepers positioned between the uppermost and lowermost sleepers. Preferably, the spacers and sleepers are made of wood, and the bundling strap means are employed for encircling the sleepers and spacers in either a parallel or perpendicular direction relative to the surface of the sleepers on which the elongated pipes are deposited.

The binding device for a plurality of elongated pipes thus constructed has sufficient mechanical strength to bear against deformation, and enables to fix tightly each elongated pipe within the space defined by the surfaces of the sleepers and spacers. As a result, the binding device protects the elongated pipes from crush, bending or damages during storage, handling or transportation. A stable, safe and quick handling of the elongated pipes can readily be obtained by using thus constructed binding device.

While the specification concludes with the claims which particularly point out and distinctly claim that subject matter which is regarded as inventive, it is believed the invention will be more clearly understood when considering the following detailed description taken in conjunction with the accompanying figures of the drawings forming a part of this specification, wherein like reference characters designate corresponding parts in the several views.

BRIEF DESCRIPTION OF THE DRAWINGS

FIG. 1 is a perspective view showing an embodiment of the binding device according to the invention utilized in bundling a plurality of elongated pipes;

FIG. 2 is an exploded perspective view of an embodiment of the binding device according to the invention;

FIG. 3 is a plan view of a bundle in which the binding devices are used at three different position along the axes of the eight elongated pipes;

FIG. 4 is a side elevational view of the bundle shown in FIG. 3;

FIG. 5 is a front elevational view of the bundle shown in FIG. 3; and

FIG. 6 is a perspective view showing another embodiment of the binding device in which the spacers positioned between the both side two spacers have no L-shaped recesses at the both ends of its length.

DESCRIPTION OF THE PREFERRED EMBODIMENTS

A binding device generally designated at 1 for a plurality of elongated pipes 2 is illustrated which comprises first and second spacers 3 and 4, sleepers 5, and bundling straps 6 and 7 for tightly fastening and encircling a plurality of sleepers and spacers. The spacers 3 and 4, and sleepers 5 are preferably made of wood. The elongated pipes to be handled with the binding device according to this invention may be of any size and length having a substantially circular cross section, such as steel pipes, poly-vinyl chloride pipes, glass tubes or the like.

Although shown in FIGS. 1 to 6 are the bundle assemblies which includes respectively five spacers 3 and 4, three sleepers 5, and two bundling straps 6 and 7, it is to be understood that each component may be increased in number so as to accommodate a greater number of elongated pipes 2, and in addition the bundle assembly using the binding device of the invention may be stacked in multiple one by one overlying upon the other.

As best shown in FIG. 2, the first spacers 3 have respectively on its surface at intervals along its length a plurality of recesses, in this embodiment, three recesses 8, 9 and 10. The recesses 8 and 10 are formed at the both ends of its length to have a substantially L-shaped cross section, that is, the recesses 8 and 10 being defined by two right angled surfaces of the spacer 3, while the recess 9 being defined by three surfaces each intersecting at a right angle. Similarly to the first spacers 3, the second spacers 4 have three recesses 11, 12 and 13, the recesses 11 and 13 having a substantially L-shaped cross section. The only difference between the both spacers 3 and 4 is the depth of the recesses, the recesses 8, 9 and 10 having a longer depth in relation to the width of the first spacers 3 than that of the recesses 11, 12 and 13.

The sleepers 5 is formed so as to have the same cross section as that of the recesses 9 and 12, so that the sleepers 5 are coupled with the spacers 3 and 4 in relatively tight contact relation to each other.

The sleepers 5 are disposed in spaced and parallel arrangement to each other both in a vertical direction one over the other and in a horizontal direction side by side, and a plurality of the elongated pipes 2 are placed side by side on and in transverse relation to the sleeper 5. The sleepers 5 and spacers 3 and 4 extend respectively in spaced relation to each other and are assembled to form a plurality of spaces 14 defined by the surfaces of the sleepers 5 and spacers 3 and 4 and adapted to receive the outer peripheral surfaces of the respective elongated pipes 2 in tight contact relation thereto.

The first spacers 3 are located at the both end portion of the sleepers 5, while the second spacers 4 are located between the first spacers 3, thus in association with the sleepers 5 forming a plurality of spaces 14. The first and second spacers 3 and 4 are disposed one by one alternately first to couple with the one side of the sleepers 5 at their recesses and then to couple with the other side of the sleepers 5 at their recesses such that the sleepers are supported and interposed between the first and second spacers 3 and 4.

The bundling straps 6 and 7 may be hoops, wires, nylon strings or the like, or any other known strapping devices. The provision of the bundling straps 6 and 7 is effected by encircling them around the sleepers 5 and spacers 3 and 4, one being fastened in perpendicular direction relative to the surface of the sleepers 5 on which the pipes 2 are deposited, and the other being fastened in parallel direction relative to the surface.

The second spacers 4 may be modified as seen from FIG. 6 which is slightly different from those shown in FIG. 2. In this embodiment, the second spacers 4 positioned between the both end portion of the sleepers 5 are respectively formed to have only those recesses 12 which couple with the sleepers 5 positioned between the uppermost and lowermost sleepers 5, without having the recesses 11 and 13.

The method of bundling or its function when used the binding device according to the present invention will now be described.

First, a plurality of first or lowermost sleepers 5 are placed on the ground or shipping location in spaced-apart and parallel disposition, with the bundling straps 6 underlying on each sleeper 5. Then, the elongated pipes 2 are seated on the lowermost sleepers 5 in a equal spaced-apart and parallel relation to each other. A plurality of second or intermediate sleepers 5 are placed on the pipes resting on the lowermost sleepers 5 at just the upright position of the respective lowermost sleepers 5. The second spacers 4 are coupled with the lowermost and intermediate spacers 5 so as to interpose them between the spacers 4. The uppermost sleepers 5 are deposited on the pipes 2 resting on the intermediate sleepers 5 and also between the recesses 13 of the second spacers 4. After coupling the first spacers 3 with the both end portions of the sleepers 5 at the recesses 8, 9 and 10, all the sleepers 5 are arranged so as to tightly embrace within each space 14 the elongated pipes 2. Lastly, the bundling straps 6 and 7 are drawn around thus constructed bundling assembly in order to tightly secure and integrate all the components.

The elongated pipes 2 thus embraced within the spaces 14 are out of contact with each other and individually supported by the spaces. Since the spacers 3 and 4 and sleepers 5 are made of rigid enough to endure the external forces imparted thereon, the elongated pipes 2 are free of bending or twisting during handling and transportation. Moreover, the bundling assembly formed by using the binding device of the invention can afford to attain a stable, safe and quick handling of the elongated pipes, with relatively simple construction and inexpensive material.

Although the invention has been described in its preferred form with a certain degree of particularity, it is understood that the present disclosure of the preferred form has been changed in the details of construction and the combination and arrangement of parts may be restored to without departing from the spirit and the scope of the invention as hereinafter claimed.

What is claimed is:

1. A binding device for a plurality of elongated pipes comprising:

a plurality of sleepers of rectangular crosssection disposed in spaced and parallel arrangement to each other, at least a first pair of said sleepers being in a first vertical arrangement and at least a second pair of said sleepers being in a second vertical arrangement horizontally spaced apart from said first arrangement, a plurality of the elongated pipes being adapted to be placed side by side on and in transverse relation to each of said sleepers, a plurality of spacers, each spacer being formed with at least one recess, said recesses being collectively adapted to couple with at least two outer surfaces of each of said sleepers and being disposed in spaced arrangement to each other in a transverse relation to said respective sleepers, and bundling strap means for tightly fastening and encircling said plurality of sleepers and spacers, whereby said sleepers and spacers extend respectively in spaced relation to each other and are assembled to form a plurality of spacers defined by the surfaces of said sleepers and spacers and adapted to receive the outer peripheral surfaces of said respective elongated pipes in tight contact relation thereto.

2. A binding device for a plurality of elongated pipes according to claim 1, in which said spacers are disposed one by one alternately first to couple with the one side of said sleepers at their recesses and then to couple with the other side of said sleepers at their recesses in such a manner that said sleepers are interposed between said spacers.

3. A binding device for a plurality of elongated pipes according to claim 1, in which said spacer has among recesses formed on the surface thereof the recesses defined by two right angled surfaces and having substantially L-shaped cross section at both ends of its length.

4. A binding device for a plurality of elongated pipes according to any of claims 1 to 3, in which the spacers positioned between the ends of said sleepers are respectively formed to have only those recesses which couple with the sleepers positioned between the uppermost and lowermost sleepers.

5. A binding device for a plurality of elongated pipes according to claim 1, in which said plurality of spacers and sleepers are made of wood.

6. A binding device for a plurality of elongated pipes according to claim 1, in which said bundling strap means lies substantially in a plane which is perpendicular relative to the surface of said sleepers on which said elongated pipes are deposited.

7. A binding device for a plurality of elongated pipes according to claim 1, in which said bundling strap means lies substantially in a plane which is parallel relative to the surface of said sleepers on which said elongated pipes are deposited.

8. A binding device for a plurality of elongated pipes according to claim 1, in which said bundling strap means comprises at least two straps, one strap lying substantially in a plane which is parallel and another strap lying substantially in a plane which is perpendicular relative to the surface of said sleepers on which said elongated pipes are deposited.

* * * * *